March 20, 1951     U. JELINEK     2,546,002
GLASS JEWEL BEARING
Filed Jan. 21, 1944
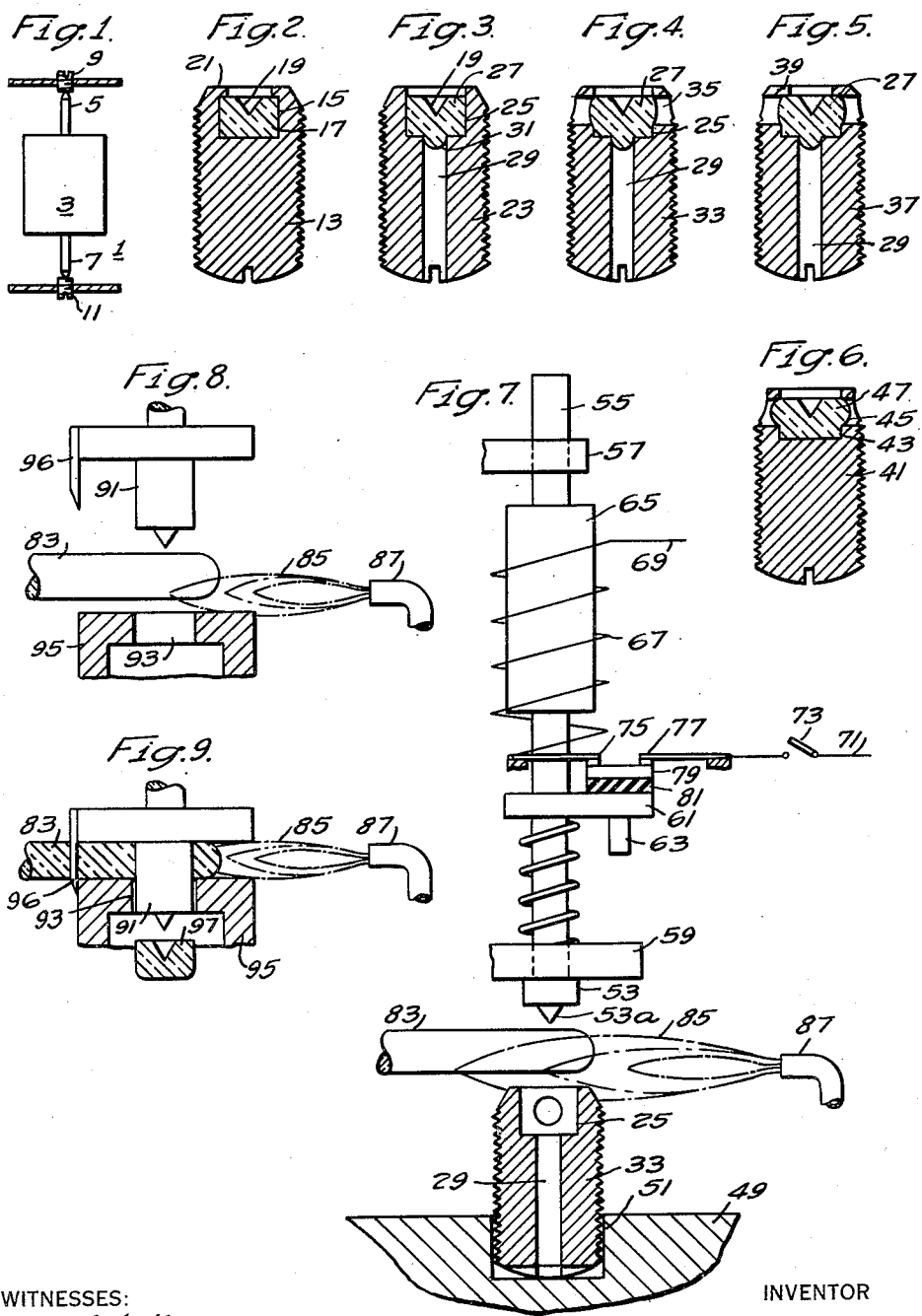
WITNESSES:
INVENTOR
Ulrich Jelinek.
BY
ATTORNEY Patented Mar. 20, 1951

2,546,002

UNITED STATES PATENT OFFICE 2,546,002

GLASS JEWEL BEARING

Ulrich Jelinek, Springfield, N. J., assignor to Westinghouse Electric Corporation, East Pittsburgh, Pa., a corporation of Pennsylvania Application January 21, 1944, Serial No. 519,172

9 Claims. (Cl. 308—159)

This invention relates to bearing assemblies and it has particular relation to bearing assemblies of the type including a bearing holder, such as a bearing screw, and a bearing jewel secured to the bearing holder.

To reduce friction to as low a value as possible, it is the practice to employ bearing jewels for supporting the rotor assemblies of instruments. Such jewels may be formed of precious stones, such as diamonds, sapphires and rubies, either of natural origin or synthetic. Alternatively, the bearing jewels may be formed of other material, such as glass. The bearing jewel ordinarily is mounted in a recess of a bearing holder such as a bearing screw. To retain the bearing jewel firmly in mounted position, a portion of the bearing screw is spun over the jewel or the jewel is secured by a staking operation. Care must be exercised to assure a firm attachment of the jewel to the bearing screw without injury to the jewel. If the spinning or staking operation does not secure the jewel firmly in position, the jewel may vibrate in the bearing screw. On the other hand, if the spinning or staking operation results in the application of excessive pressure to the jewel, the resulting stress may result in immediate or subsequent fracture of the jewel. For these reasons, it is the practice to match carefully the dimensions of the jewel and the bearing screw in which the jewel is to be mounted. Such matching is tedious and costly.

In accordance with the invention, a bearing jewel is formed from molded material, such as glass. Preferably the jewel is molded directly in the jewel support to asssure an intimate bonded engagement between adjacent surfaces of the bearing jewel and the bearing support. In order to assure adequate filling of the recess in the bearing support, an excess of moldable material may be employed during the formation of the bearing jewel. A small opening communicating with the recess, may be formed in the bearing screw to permit escape of the excess moldable material from the recess in the bearing holder.

It is desirable that the profiles of the bearing surfaces of bearing jewels be inspected prior to use thereof. In accordance with a further aspect of the invention, the bearing holder for a bearing jewel is provided with an opening positioned to permit inspection therethrough of the profile of a bearing surface in a bearing jewel positioned in the holder. This permits inspection of the jewel after it is completely mounted in its holder.

It is, therefore, an object of the invention to provide an improved bearing assembly which includes a bearing jewel formed of molded material.

It is a further object of the invention to provide an improved bearing assembly comprising a bearing holder and a molded bearing jewel which is molded directly in the bearing holder.

It is another object of the invention to provide an improved bearing assembly which includes a bearing holder having a bearing jewel molded therein and having an opening therein for receiving excess material of the molded jewel.

It is a still further object of the invention to provide an improved bearing assembly having a jewel holder and a bearing jewel positioned in the holder wherein an opening is provided in the bearing holder to permit inspection of the profile of the bearing surface formed in the bearing jewel.

Other objects of the invention will be apparent from the following description, taken in conjunction with the accompanying drawing, in which:

Figure 1 is a view in side elevation with parts in section of an instrument having a rotor assembly mounted for rotation in suitable bearing assemblies.

Figs. 2 to 6, inclusive, are views in sectional elevation showing various modifications of bearing assemblies each including a bearing holder and a bearing jewel.

Fig. 7 is a view in elevation with parts in section and parts shown schematically of molding apparatus suitable for molding bearing jewels in bearing holders; and Figs. 8 and 9 are views in sectional elevation with parts in section and parts broken away of apparatus suitable for molding bearing jewels.

Referring to the drawing, Fig. 1 shows an instrument 1 which includes a rotor assembly 3. This rotor assembly has a pair of pivots 5 and 7 which engage bearing assemblies 9 and 11 to mount the rotor assembly for rotation with respect to the bearing assemblies. The bearing assemblies may be similar in structure to any of those shown in Figs. 2 to 6, inclusive.

In Fig. 2, a bearing assembly is illustrated which includes a bearing holder in the form of a bearing screw 13. This bearing screw has a recess 15 formed therein for receiving a bearing jewel 17. The bearing jewel 17 has a suitable bearing surface formed therein such as that represented by a cup or V-type surface 19. If desired, portions of the bearing screw 13 may be spun over the jewel 17 to form a retaining rim 21. However, care should be exercised to assure firm engagement of the rim 21 with the bearing jewel 17 without unduly stressing the bearing jewel. If the rim 21 does not engage firmly the bearing jewel 17, the bearing jewel may vibrate in its recess 15. On the other hand, if the rim 21 is urged too firmly against the bearing jewel 17, the resulting stress immediately or subsequently may fracture the bearing jewel.

To simplify the attachment of the bearing jewel 17 to the bearing screw 13, the bearing jewel 17 may be formed of moldable material and may be molded directly in the recess 15. If the moldable material has sufficient fluidity the material is urged into firm engagement with the surfaces of the recess 15. At the same time, the bearing surface represented by the cup 19 is formed in the bearing jewel. This method of forming a bearing jewel will be discussed in greater detail below. It should be observed, however, that some difficulty may be encountered in permitting the escape of air from the recess 15 during the molding operation and in filling the recess 15 to the desired extent.

By providing an overflow duct or hole in the bearing screw 13, a number of advantages result. For example, in Fig. 3 a bearing screw 23 is provided which has a recess 25 for receiving a bearing jewel 27. In addition, a duct or opening 29 is provided which communicates with the recess 25. This opening 29 may be formed conveniently by drilling a small opening through the bearing screw. When the jewel 27 is formed, an excess of moldable material may be forced into the recess 25. The excess 31 flows into the opening 29, thereby assuring the filling of the recess 25 to the desired extent. If desired, the excess 31 may be employed to engage the wall of the opening 29 to aid further in retaining the bearing jewel 27 in the bearing screw 23.

With the construction illustrated in Fig. 3, the bearing surface 19 formed in the bearing jewel 27 may be inspected through the opening 29 or through the open end of the recess 25. However, it is also desirable to inspect the profile of the bearing surface or cup 19. To this end, the bearing screw may be provided with a transverse opening, as illustrated in Fig. 4. In Fig. 4, a bearing screw 33 is illustrated which is similar to the bearing screw 23 except for the addition thereto of a transverse opening 35 therein. This opening may be formed by drilling a small opening through the bearing screw 33 prior to the insertion of the bearing jewel 27 therein. Since the bearing jewel 27 is formed of a light-permeable material, the profile of the bearing surface therein may be inspected through the opening 35. During such inspection, it is convenient to immerse the bearing screw and its associated bearing jewel in a liquid having a refractive index substantially equal to that of the bearing jewel 27.

In Figs. 3 and 4 the bearing screw 23 or 33 is not spun over the bearing jewel 27 to secure the bearing jewel in position. If the bearing jewel 27 is molded directly in the associated bearing screw, it has been found that the material of the bearing jewel intimately engages and bonds to the associated surfaces of the bearing screw to retain the bearing jewel firmly in position. By suitably regulating the fluidity of the moldable material and the pressure applied thereto, the material may be forced to conform to irregularities in the surface surrounding the recess in the bearing screw which further assures retention of the jewel in the bearing screw.

In Fig. 4, the bearing jewel 27 does not project appreciably into the opening 35. If the material of which the bearing jewel 27 is formed is highly viscous and if the pressure employed is restricted to the amount required to form the bearing surface in the bearing jewel and to fill the recess to the desired extent, it has been found that the material of the bearing jewel does not project appreciably into the opening 35. A suitable material and a suitable technique for constructing the bearing screw similar to that of Fig. 4 will be discussed below. Although it has been found unnecessary to spin the edges of the screw 23 or 33 over the associated bearing jewel 27, such spinning may be employed, if desired. For example, in Fig. 5, a bearing screw 37 is illustrated which is similar in structure to the bearing screw 33 except for the spinning of the end of the bearing screw over the associated bearing jewel 27 to form a retaining rim 39.

If desired, the opening 29 may be omitted from the bearing screw of Fig. 4. This results in a bearing screw similar to the bearing screw 41 of Fig. 6. The bearing screw 41 has a recess 43 which corresponds to the recess 25 of Fig. 4 and a transverse opening 45 which corresponds to the opening 35 of Fig. 4. A bearing jewel 47 may be molded in the recess 43. If the fluidity of the material employed for the bearing jewel 47 is sufficient with relation to the molding pressure employed, excess material is forced into the opening 45.

For constructing a bearing assembly similar to those illustrated in Figs. 2 to 6, apparatus similar to that illustrated in Fig. 7 may be employed. In Fig. 7, a work table 49 is provided with an opening 51 proportioned to receive snugly the lower end of one of the bearing screws, such as the bearing screw 33. In addition, a molding head 53 is arranged for movement from the position illustrated in Fig. 7 to a position wherein the molding head 53 enters the recess 25 of the bearing screw 33. To this end, the molding head 53 is secured to a shaft 55 which is reciprocable through guide brackets 57 and 59. The shaft 55 has secured thereto an arm 61 which carries a stop member 63. During operation of the apparatus, the stop member 63 engages the guide bracket 59 to determine the extent to which the molding head 53 enters the recess 25. A spring is inserted between the arm 61 and the guide bracket 59 to urge the shaft 55 towards the position illustrated in Fig. 7.

In order to urge the molding head 53 into the recess 25, the shaft 55 is provided with a magnetic armature 65 which is associated with a solenoid 67. The solenoid 67 may be energized from a suitable source of electrical energy through conductors 69 and 71 in response to closure of a switch 73. Conveniently, the switch 73 may be of the one-cycle type which momentarily closes its contacts once for each actuation thereof. This closure should be for a duration sufficient to actuate the molding head 53 into the recess 25. To assure interruption of the circuit, a pair of contacts 75 and 77 may be included in the energizing circuit of the solenoid 67. These contacts are connected by a bridging member 79 which is secured to a strip of insulation 81 carried by the arm 61. When the arm 61 descends from the position illustrated in Fig. 7 for a predetermined distance the bridging member 79 opens the solenoid circuit.

Moldable material may be supplied to the recess 25 in the form of rods, balls, pellets, or slugs. In Fig. 7, the moldable material is in the form of a glass rod 83 which is inserted between the molding head 53 and the bearing screw 33. This glass rod is heated to a molding temperature by means of a flame 85 directed thereagainst from a gas burner 87. It will be observed that the flame serves to heat not only the glass rod but the bearing screw 33. This is desirable in order to prevent too rapid chilling of the glass as it is urged into recess 25. Since the bearing screw 33 projects appreciably from the work table 49, the work table does not conduct heat from the bearing screw too rapidly.

It is believed that the operation of the apparatus illustrated in Fig. 7 now may be set forth. With the parts in the positions illustrated in Fig. 7, the temperature of the glass rod 83 rises to a molding temperature. To prevent the tip of the rod from sagging, the rod may be rotated as it heats. When the rod has reached a temperature at which it may be molded, the switch 73 is closed to actuate the molding head 53 into the recess 25. The molding head 53 shears a portion of the glass from the rod and forces it into the recess 25. During this step, the contour of the molding head 53 is molded into the glass which is urged into the recess 25 and excess glass is forced into the opening 29. Preferably, the cross section of the rod 83 is sufficient to assure the filling of the recess 25 to the desired level and to assure the presence of an excess to be directed into the opening 29.

After the stop member 63 has engaged the guide bracket 59, the spring promptly returns the molding head 53 to the position illustrated in Fig. 7. Preferably, the temperature of the glass inserted into the recess 25 is so controlled that the surface of the glass has a slight after-flow after the molding head 53 is removed therefrom. This after-flow should be sufficient to fill any slight imperfection left in the surface of the glass by the molding head 53, but should not be sufficient to change the dimensions of the bearing surface appreciably. Since the after-flow results in a slight variation in the dimensions of the bearing surface left in the glass jewel, the molding head 53 should be provided with a molding surface 53a which allows for the slight change in dimensions produced by the after-flow. In the specific example here considered, the molding surface 53a is designed to produce a bearing surface of the cup or V-type. To compensate for the slight after-flow, the molding surface 53a has a conical configuration wherein the angle of the cone is slightly less than the desired angle of the resulting surface. The tip of the cone is slightly rounded and has a radius slightly greater than that desired for the resulting surface. Finally, the depth of the penetration of the molding surface 53a into the glass jewel is slightly greater than that present in the glass jewel following the after-flow. The molding surface 53a preferably is formed of a highly polished material such as a high speed steel to prevent adhesion between the molding surface and the glass.

The materials employed may vary appreciably. Excellent results have been obtained when the rod 83 is formed of a glass known as "Corning 172." This specific glass may have a percentage composition (by weight) substantially as follows:

| | Per cent |
|---|---|
| Silica ($SiO_2$) | 59 |
| Alumina ($Al_2O_3$) | 21.5 |
| Iron (Fe) | 0.5 |
| Calcium oxide (CaO) | 4.4 |
| Magnesia (MgO) | 10 |
| Boric anhydride ($B_2O_3$) | 4.6 |

The flame in which the glass in heated may have a temperature of the order of 2,000 to 2,500° F. The length of time required to heat the glass rod 83 to the desired temperature depends upon the diameter of the rod. For a rod having a diameter of .090 inch, the time required to heat it to the desired temperature is approximately 10 seconds.

Good results also have been obtained from a lime glass having the following composition:

| | Per cent |
|---|---|
| $SiO_2$ | 72.5 |
| $Fe_2O_3 + Al_2O_3$ | 2.0 |
| CaO | 5.0 |
| MgO | 4.5 |
| NaO | 16 |

As a further example, Pyrex glass has been found to provide suitable bearing jewels. Although other moldable materials may be employed, the first-mentioned glass composition has been found satisfactory from the standpoint of low friction and long wearing qualities of the bearing assembly.

The bearing screws need not be formed of a material having the same temperature coefficient of expansion as that of the bearing jewels. For example, good results have been obtained when the bearing screws were formed of aluminum or brass. Such materials, on cooling, grip the glass jewel firmly without applying undue stress thereto. In addition, both aluminum and brass may be machined easily. In bearing screws actually constructed the wall surrounding the jewel recess 25 has a thickness of approximately .012".

A somewhat similar technique may be employed in producing bearing jewels which may be separately mounted in bearing screws similar to the bearing screw of Fig. 2. For example, in Figs. 8 and 9, apparatus is illustrated for making molded jewels. This apparatus includes a molding head 91 which corresponds to the molding head 53 of Fig. 7. The molding head 91 is proportioned for reception in an opening 93 provided in a die 95 which is employed in place of the work table 49 and bearing screw 33 of Fig. 7. In addition, the molding head 91 may have secured thereto a knife 96 for severing the tip of the rod 83 after each molding operation.

In operation, the glass rod 83 is heated to the desired temperature by the flame 85 in the manner discussed with reference to Fig. 7. When the rod 83 has reached the desired temperature, the molding head 91 is actuated to force a portion of the rod 83 through the opening 93, as shown more clearly in Fig. 9. The viscosity of the glass is such that it takes the contour of the molding head as the molding head forces a portion of the glass rod through the opening to form the glass jewel 97. As the glass jewel 97 leaves the molding head 91, a slight after-flow takes place to produce an extremely smooth mirror bearing surface thereon. The bearing jewel 97 may be mounted in a bearing screw similar to the bearing screw 13 by the conventional spinning or staking operation previously discussed. Except for the specific changes discussed with reference to Figs. 8 and 9, the apparatus therein illustrated may be similar in construction and operation to that illustrated in Fig. 7.

The expressions "intimately bonded" and "intimate bonding" are employed to connote the bond between two surfaces which form faithful reflections of each other. The two surfaces intimately engage each other over substantial areas. Such surfaces are formed, for example, by molding a plastic material such as heated glass against the surface of a holder for the glass.

Although the invention has been described with reference to certain specific embodiments thereof, numerous modifications are possible. Therefore, the invention is to be restricted only by the appended claims as interpreted in view of the prior art.

I claim as my invention:

1. In a bearing assembly, a jewel holder having a recess, said jewel holder having an opening extending from only part of a wall of said recess, and a glass jewel member positioned in said recess, said jewel holder and said jewel member having engaging surfaces intimately bonded to each other, and said jewel member having a portion extending into said opening.

2. In a bearing assembly, a jewel holder having a recess providing a seat opposite the mouth of the recess, said jewel holder having an opening communicating with said recess, and a jewel member positioned in said recess, said jewel member and said jewel holder having engaging surfaces intimately bonded to each other.

3. In a V-type bearing assembly, a jewel holder having a recess providing a seat opposite the mouth of the recess, said jewel holder having an opening communicating with said recess, and a light-permeable bearing jewel member permanently positioned in said recess, said opening being positioned to admit light to said jewel member for facilitating inspection of the bearing surface thereof.

4. In a bearing assembly, a bearing screw having a recess in a first end thereof providing a seat opposite the mouth of the recess, said bearing screw having an opening extending axially from said recess to the second end of said bearing screw through a portion of said seat, and a glass bearing jewel member hot molded in said recess to provide surfaces intimately bonded to the walls of said recess including said seat, said bearing jewel member having a portion extending into said opening.

5. In a bearing assembly, a bearing screw having a recess in a first end thereof providing a seat opposite the mouth of the recess, and a bearing jewel member disposed in said recess, said bearing screw having an opening extending therethrough in a direction transverse to the axis of said bearing screw for permitting inspection therethrough of the profile of the bearing surface of said bearing jewel member.

6. In a bearing assembly, a bearing screw having a recess in a first end thereof providing a seat opposite the mouth of the recess, and a glass bearing jewel member disposed in said recess, said bearing jewel member being hot molded in said recess to provide intimate bonding between adjacent surfaces of said bearing screw and said bearing jewel member, said bearing screw having an opening extending therethrough in a direction transverse to the axis of said bearing screw for permitting inspection therethrough of the profile of the bearing surface of said bearing jewel member.

7. In a bearing assembly, a bearing screw having a recess in a first end providing a seat opposite the mouth of the recess, said bearing screw having an axial opening extending from the second end of said bearing screw through a portion of said seat, a bearing jewel member in said recess, said bearing screw having an opening extending radially therethrough for exposing the profile of the bearing surface of said bearing jewel member for inspection.

8. In a bearing assembly, a bearing screw having a recess in a first end providing a seat opposite the mouth of the recess, said bearing screw having an axial opening extending from the second end of said bearing screw through a portion of said seat, a glass bearing jewel member hot molded in said recess to provide intimate bonding between adjacent surfaces of said bearing jewel member and said bearing screw, said bearing screw having an opening extending radially therethrough for exposing the profile of the bearing surface of said bearing jewel member for inspection.

9. In a bearing assembly, a bearing screw having a recess providing a seat opposite the mouth of the recess, said bearing screw having an opening communicating with said recess, and a jewel member positioned in said recess, said jewel member and said bearing screw having engaging surfaces intimately bonded to each other.

ULRICH JELINEK.

REFERENCES CITED

The following references are of record in the file of this patent:

UNITED STATES PATENTS

| Number | Name | Date |
|---|---|---|
| 197,869 | Lehmann | Dec. 4, 1877 |
| 786,366 | DeLancey | Apr. 4, 1905 |
| 805,303 | Kuch | Nov. 21, 1905 |
| 966,784 | Anderson | Aug. 9, 1910 |
| 1,366,132 | Pitkin | Jan. 18, 1921 |
| 1,406,502 | Shand | Feb. 14, 1922 |
| 1,848,312 | Bruzzone | Mar. 8, 1932 |
| 2,092,281 | Knopp | Sept. 7, 1937 |
| 2,099,854 | Kurz | Nov. 23, 1937 |
| 2,127,196 | Worley | Aug. 16, 1938 |
| 2,189,860 | Frei | Feb. 13, 1940 |
| 2,206,797 | Williams | July 2, 1940 |
| 2,274,105 | Stewart et al. | Feb. 24, 1942 |
| 2,300,362 | Shotter | Oct. 27, 1942 |
| 2,316,920 | Weber | Apr. 20, 1943 |
| 2,376,742 | Wempe | May 22, 1945 |
| 2,396,462 | Grace | Mar. 12, 1946 |
| 2,405,892 | Lederer et al. | Aug. 13, 1946 |

FOREIGN PATENTS

| Number | Country | Date |
|---|---|---|
| 542,056 | Great Britain | Dec. 23, 1941 |